(12) United States Patent
Fredholm (10) Patent No.: US 12,338,154 B2
(45) Date of Patent: Jun. 24, 2025

(54) METHODS FOR FORMING THIN GLASS SHEETS

(71) Applicant: Corning Incorporated, Corning, NY (US)

(72) Inventor: Allan Mark Fredholm, Vulaines sur Seine (FR)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/184,101

(22) Filed: Nov. 8, 2018

(65) Prior Publication Data

US 2019/0169059 A1    Jun. 6, 2019

Related U.S. Application Data

(60) Provisional application No. 62/594,175, filed on Dec. 4, 2017.

(51) Int. Cl.
*C03B 13/04* (2006.01)
*C03B 7/08* (2006.01)
(Continued)

(52) U.S. Cl.
CPC ............... *C03B 13/04* (2013.01); *C03B 7/08* (2013.01); *C03B 13/16* (2013.01); *C03B 17/06* (2013.01); *C03B 21/02* (2013.01)

(58) Field of Classification Search
CPC ......... C03B 13/04; C03B 17/06; C03B 21/02; C03B 7/08; C03B 13/16
See application file for complete search history.

(56) References Cited

U.S. PATENT DOCUMENTS

| 3,227,537 | A |   | 1/1966 | Novack |
| 3,256,081 | A | * | 6/1966 | Peyches ................. C03B 25/08 |
|           |   |   |        | 65/184 |

(Continued)

FOREIGN PATENT DOCUMENTS

| CN | 103608305 A | 2/2014 |
| CN | 104220386 A | 12/2014 |

(Continued)

OTHER PUBLICATIONS

Machine translation of WO 2012/169430, Takahashi, Glass Formming Roll, and Method for Producing Glass Plate, Dec. 13, 2012 (Year: 2012).*

(Continued)

*Primary Examiner* — Queenie S Dehghan
(74) *Attorney, Agent, or Firm* — Amy T. Lang; Kevin L. Bray (57) ABSTRACT

According to one or more embodiments disclosed herein, a glass sheet may be formed by a method which includes supplying a feed of molten glass to an upper surface of a pair of forming rolls, and rotating the pair of forming wheels to continuously form a glass sheet from the molten glass. The pair of forming rolls may be spaced apart by a forming gap, and the forming gap may have a width of less than or equal to about 800 microns. The molten glass may have a viscosity of less than or equal to about 200 poise. The glass sheet may have a thickness of less than or equal to about 800 microns immediately upon passing though the forming gap.

15 Claims, 5 Drawing Sheets

(51) Int. Cl.
   *C03B 13/16* (2006.01)
   *C03B 17/06* (2006.01)
   *C03B 21/02* (2006.01)

(56) References Cited

U.S. PATENT DOCUMENTS

| | | | | |
|---|---|---|---|---|
| 3,355,275 | A * | 11/1967 | Sensi | C03B 35/246 65/99.2 |
| 2009/0217704 | A1 | 9/2009 | Shiraishi et al. | |
| 2010/0273633 | A1 * | 10/2010 | Kitaoka | C03C 3/19 501/46 |
| 2012/0304695 | A1 | 12/2012 | Lakota et al. | |
| 2013/0264672 | A1 * | 10/2013 | Schreder | H01L 31/0216 257/432 |
| 2015/0099618 | A1 * | 4/2015 | Bisson | C03B 17/061 65/25.2 |
| 2015/0178159 | A1 | 6/2015 | Mukai | |
| 2015/0315064 | A1 * | 11/2015 | Wolff | C03C 3/062 257/40 |
| 2016/0156065 | A1 * | 6/2016 | Visco | C03C 4/18 65/106 |
| 2017/0338428 | A1 * | 11/2017 | Loeffelbein | C03B 23/047 |

FOREIGN PATENT DOCUMENTS

| | | |
|---|---|---|
| DE | 102006015223 B3 | 8/2007 |
| JP | 2010-275182 A | 12/2010 |
| JP | 2014-520059 A | 8/2014 |
| JP | 2016-532620 A | 10/2016 |
| WO | 2010096630 A1 | 8/2010 |
| WO | 2010141846 A1 | 12/2010 |
| WO | 2012169430 A1 | 12/2012 |

OTHER PUBLICATIONS

JP H1039153 machine translation, Konishi Shigeru et al., Product of Optical Waveguide, Feb. 1998 (Year: 1998).*
JP 2012123239 machine translation, Kishinami Katsuya, Photographic Lens, Jun. 2012 (Year: 2012).*
International Search Report and Written Opinion PCT/US2018/063561 Dated Feb. 25, 2019, 12 Pgs.
Bisson; "Systems and Methods for Processing Thin Glass Ribbons"; Filed as PCT/US2018058124 on Oct. 30, 2018; 28 Pages.
Fournel et al; "Apparatus and Method for Processing a Glass Substrate "; Filed as U.S. Appl. No. 62/524,191 on Jun. 23, 2017; 150 Pages.
Chinese Patent Application No. 201880078574.7, Office Action dated Feb. 21, 2022, 5 pages of English Translation, Chinese Patent Office.
Japanese Patent Application No. 2020-530320, Office Action, dated Sep. 21, 2022, 6 pages (3 pages of English Translation and 3 pages of Original Copy); Japanese Patent Office.

* cited by examiner

METHODS FOR FORMING THIN GLASS SHEETS

This application claims the benefit of priority to the U.S. Provisional Application Ser. No. 62/594,175 filed on Dec. 4, 2017, the content of which is relied upon and incorporated herein by reference in its entirety.

BACKGROUND

Field

This disclosure relates to processes for glass forming and, more particularly, to processes for forming glass sheets.

Technical Background

There is a market demand for very thin glass sheets having, for example, a thickness of less than 1 mm. Such thin glass sheets may be utilized in consumer electronics. These glass sheets should be relatively flat with consistent thickness. However, expensive and/or time consuming steps may be necessary to produce such thin glass sheets, such as cutting and/or polishing procedures. Additionally, applications of the glass sheets may demand for special properties of the glass, such as relatively high refractive index. For example, thin glass sheets having relatively high refractive index may be incorporated into OLED lighting devices and augmented reality electronic devices. However, such high refractive index glasses may have properties which are incompatible with standard sheet forming operations. Accordingly, there is a need for processes to produce thin glass substrates more efficiently and at lower cost.

SUMMARY

According to one or more embodiments, a glass sheet may be formed by a method comprising supplying a feed of molten glass to an upper surface of a pair of forming rolls, and rotating the pair of forming rolls to continuously form a glass sheet from the molten glass. The pair of forming rolls may be spaced apart by a forming gap, and the forming gap may have a width of less than or equal to about 800 microns. The molten glass may have a viscosity of less than or equal to about 200 poise. The glass sheet may have a thickness of less than or equal to about 800 microns immediately upon passing though the forming gap.

According to additional embodiments, a high refractive index glass sheet may be formed by a method comprising supplying a feed of molten glass to an upper surface of a pair of forming rolls, and rotating the pair of forming rolls to continuously form a glass sheet from the molten glass. The pair of forming rolls may be spaced apart by a forming gap, and the forming gap may have a width of less than or equal to about 800 microns. The molten glass may have a viscosity of less than or equal to about 200 poise. The glass sheet may have a thickness of less than or equal to about 800 microns immediately upon passing though the forming gap. The glass composition of the glass sheet may have a refractive index of about 1.7 or greater and a liquidus viscosity of about 200 poise or less.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

According to embodiments described herein, glass sheets may be continuously formed by a process which utilizes a pair of forming rollers to process molten glass into a thin glass sheet having a relatively constant thickness. The glass sheets may have a thickness of, for example, less than 1 mm, such as less than 800 microns, less than 500 microns, or even less than 300 microns. Additionally, the formed glass sheets may have a width of, for example, at least 100 mm, at least 200 mm, or even greater. Such glass sheets may be further processed into wafers by cutting. However, additional cutting or rolling operations needed to reduce the thickness of the glass sheet may not be necessary to attain the desired glass sheet dimensional specifications.

Additionally, according to some embodiments, the glass sheets described herein may be formed from glass compositions which have relatively low liquidus viscosity, such as, for example, less than 500 poise, or even less than 100 poise. Such liquidus viscosities may be common for glass compositions which having relatively high refractive indices (e.g., greater than 1.7 or even greater than 1.75). Conventional glass forming procedures may not be well equipped to handle such glass and form it at such small thicknesses and high aspect ratios.

Figure 1:
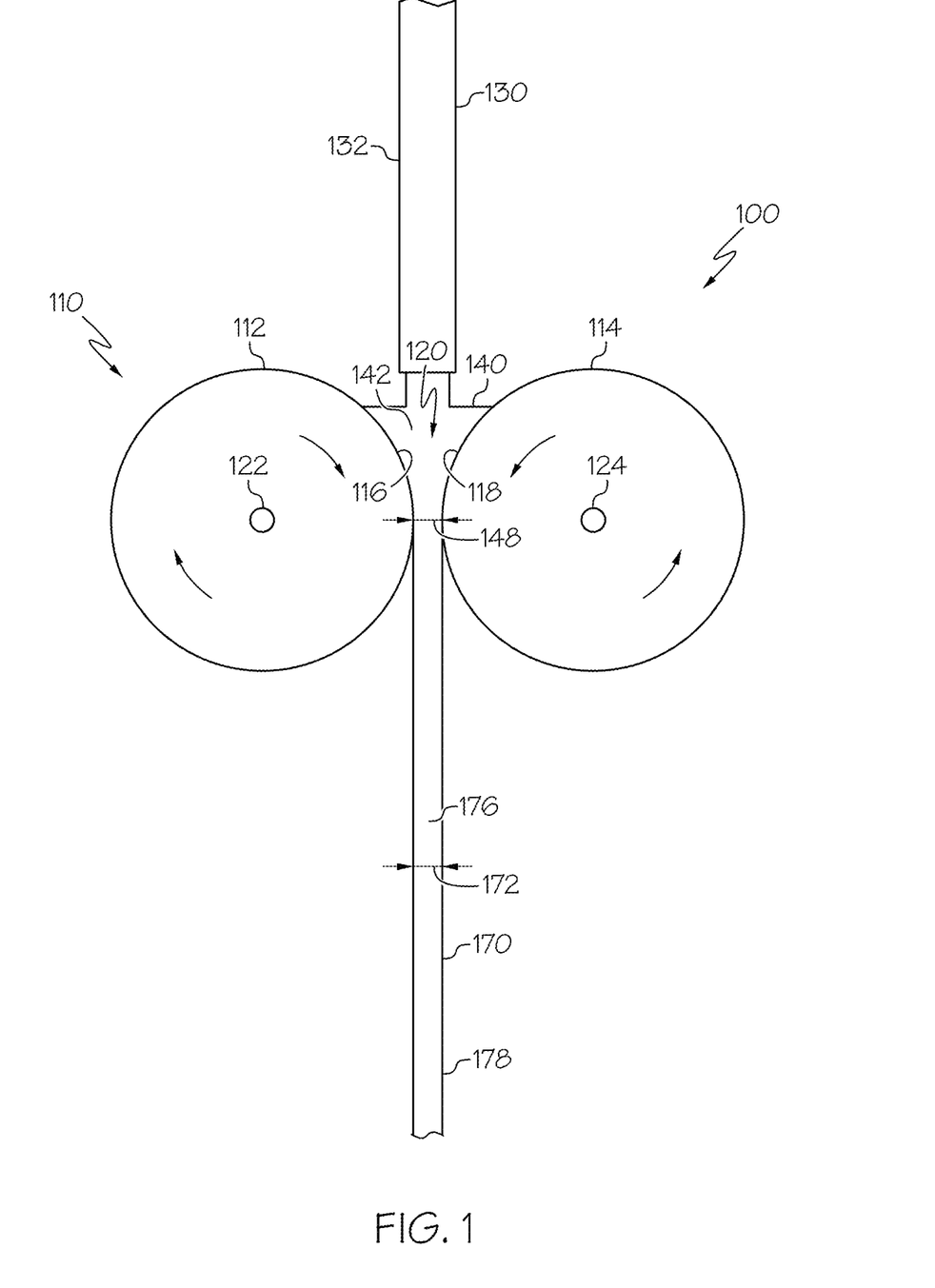
FIG. 1 schematically depicts side view of a generalized glass sheet forming apparatus comprising a single point source molten glass delivery device, according to one or more embodiments described herein.
Figure 2:
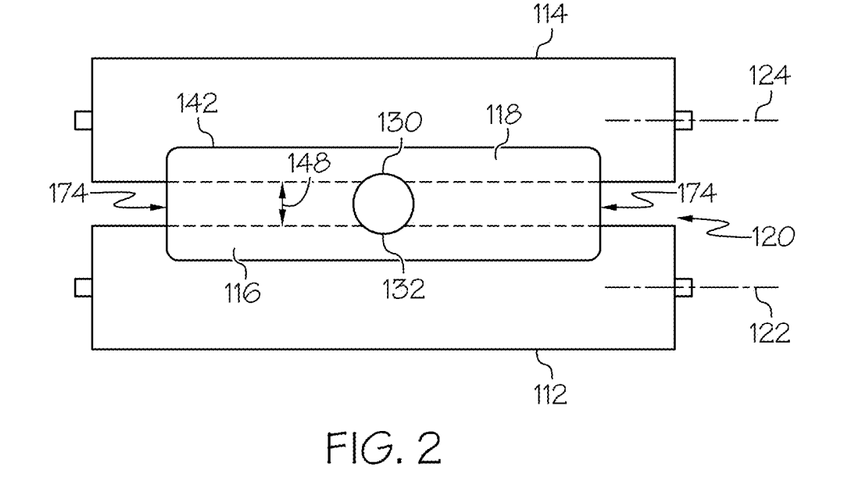
FIG. 2 schematically depicts a top view of the glass sheet forming apparatus of FIG. 1, according to one or more embodiments described herein.
Figure 3:
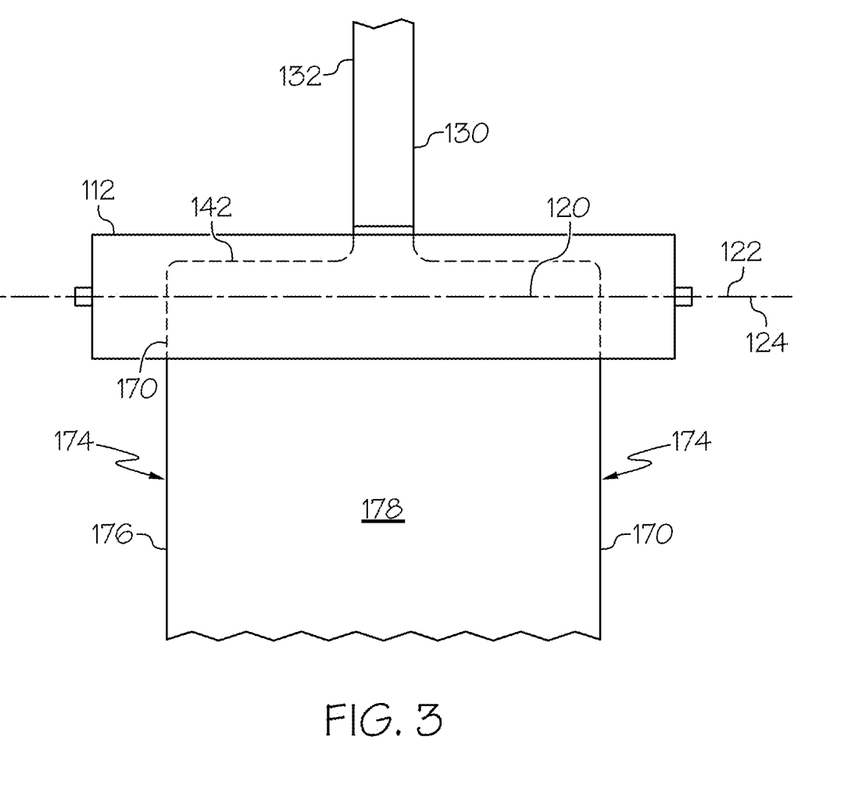
FIG. 3 schematically depicts an alternate side view of the glass sheet forming apparatus of FIG. 2, according to one or more embodiments described herein.

Now referring to FIG. 1-3, a glass sheet forming apparatus 100 is schematically depicted, according to one or more embodiments disclosed herein. The glass sheet forming apparatus 100 may include at least a molten glass delivery device 130 and a pair of forming rolls 110 (i.e., first forming roll 112 and a second forming roll 114). The first forming roll 112 and the second forming roll 114 may be arranged horizontally with respect to one another, and the molten glass delivery device 130 may be arranged substantially above the pair of forming rolls 110. The first forming roll 112 may comprise a first radial axis 122, and the second forming roll 114 may comprise a second radial axis 124. The first forming roll may be operable to rotate around the first radial axis 122, and the second forming roll 114 may be operable to rotate around the second radial axis 124. In some embodiments, the first radial axis 122 and the second radial axis 124 may be horizontally aligned.

The first forming roll 112 and the second forming roll 114 may be separated by an area referred to herein as the forming gap 120. The forming gap 120 comprises the area between the first forming roll 112 and the second forming roll 114, at or near their closest point. The forming gap 120 has a width 148 as measured between the first forming roll 112 and the second forming roll 114. In embodiments where the pair of forming rolls 110 are horizontally aligned, the width 148 of the forming gap 120 is measured in a horizontal direction. In one or more embodiments, no portion of the first forming roll 112 contacts any portion of the second forming roll 114. In additional embodiments, the edges of the forming rolls 110 contact one another, but the forming rolls 110 are shaped such as to from a forming gap 120 where the molten glass 140 contacts the forming rolls 110.

The molten glass delivery device 130 may supply a feed of molten glass 140 to an upper surface 116, 118 of the pair of forming rolls 110. The molten glass delivery device 130 may be positioned relative to the first forming roll 112 and the second forming roll 114 such that molten glass is fed directly over the forming gap 120. In other embodiments, the molten glass delivery device 130 may not be exactly centered over the forming gap 120, but may be positioned to expel molten glass into the "valley" formed by the first forming roll 112 and the second forming roll 114.

While FIGS. 1-3 depict the molten glass delivery device 130 as a pipe 132, the molten glass 140 may be delivered using any suitable glass delivery method by any suitable device. For example, the molten glass 140 may be delivered to the pair of forming rolls 110 in batches from a crucible or a pre-shaped ladle. In another embodiment, the molten glass 140 may be continuously fed to the pair of forming rolls 110 as a stream of glass from a fishtail orifice, slot orifice, fusion forming isopipe, or an extrusion furnace.

As shown in FIGS. 1-3 the molten glass 140 may be delivered through a single pipe 132. As described herein, pipes, or other conduit means which deliver the molten glass substantially in a single dimension are referred to as point source delivery devices. For example, substantially cylindrical tubes, conduits, hoses, mains, ducts, lines, channels, pipelines, and drains are all considered point source delivery devices. According to one or more embodiments, a pipe 132 may be utilized that has a diameter of from about 4 mm to about 15 mm. However, other sizes and subranges of pipe diameter are contemplated based on desired width and thickness of the formed glass sheet 170.

Figure 4:
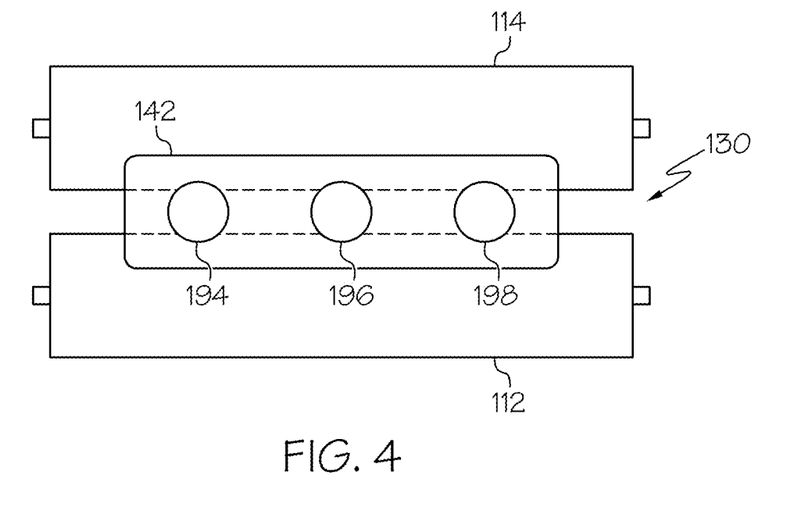
FIG. 4 schematically depicts a top view of a glass sheet forming apparatus similar to FIG. 1, but comprising a multiple point source molten glass delivery device, according to one or more embodiments described herein.
Figure 5:
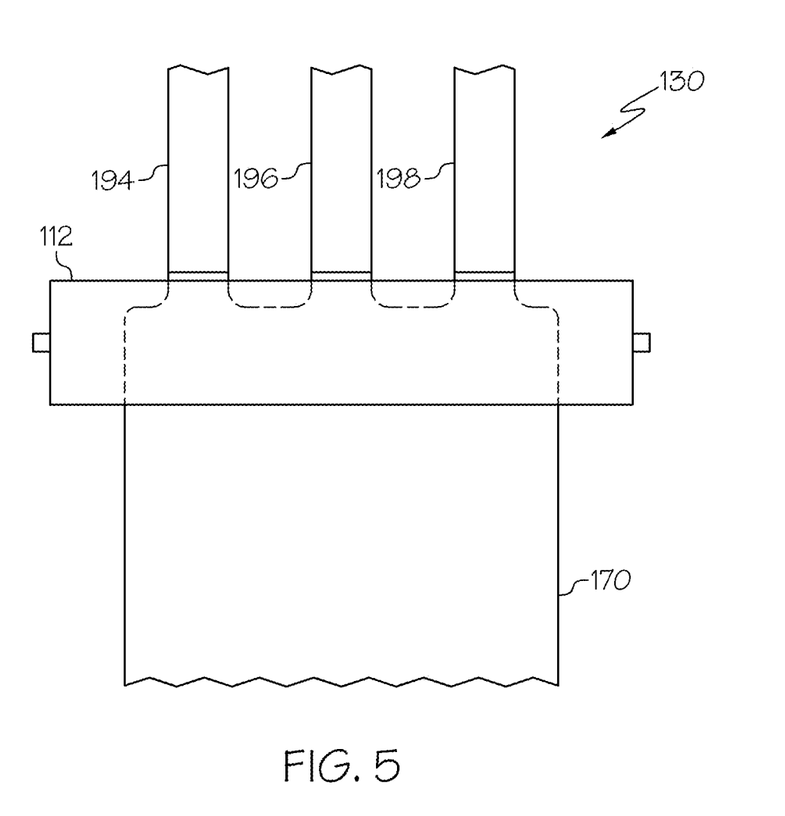
FIG. 5 schematically depicts an alternate side view of the glass sheet forming apparatus of FIG. 4, according to one or more embodiments described herein.

In other embodiments, the molten glass 140 may be delivered through a plurality of point sources. For example, as shown in FIGS. 4 and 5, the molten glass delivery device 130 may comprise a plurality of pipes, such as a first pipe 194, a second pipe 196, and a third pipe 198. The plurality of pipes 194, 196, 198 may be positioned along a major length of the forming gap 120 (perpendicular to the width 148 of the forming gap 120).

Figure 6:
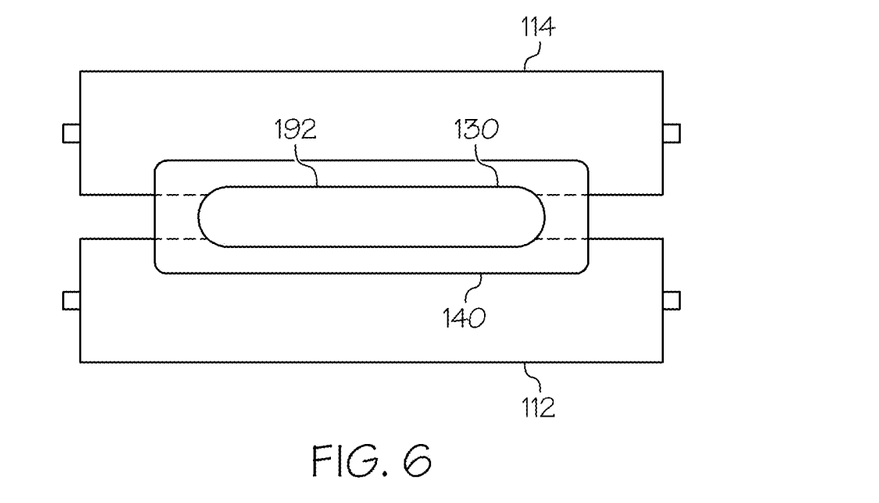
FIG. 6 schematically depicts a top view of the glass sheet forming apparatus similar to FIG. 1, but comprising a slot orifice molten glass delivery device, according to one or more embodiments described herein.
Figure 7:
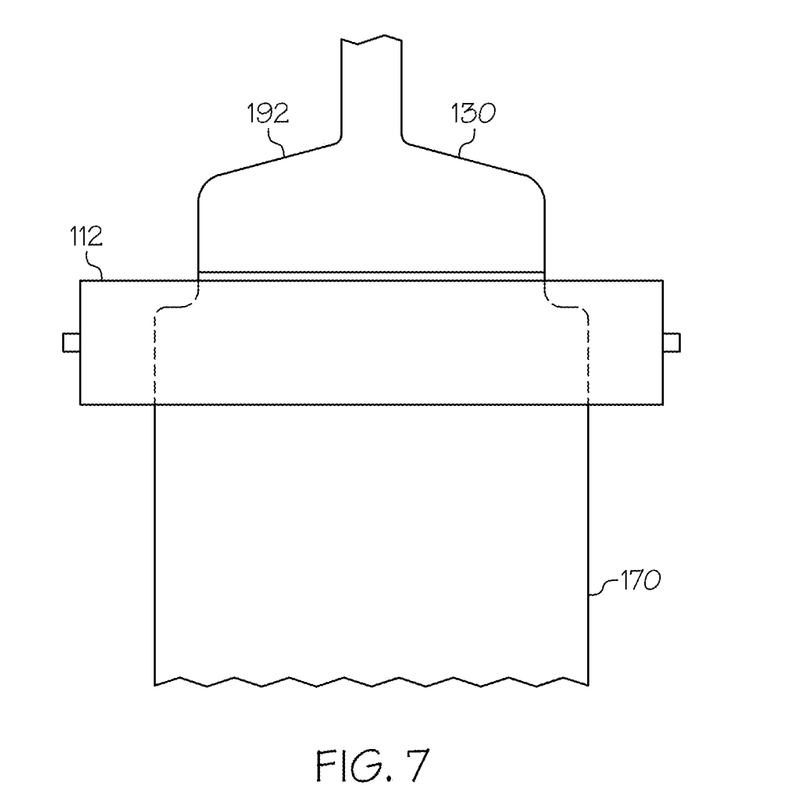
FIG. 7 schematically depicts an alternate side view of the glass sheet forming apparatus of FIG. 6, according to one or more embodiments described herein.

In additional embodiments, the molten glass 140 may be delivered through non-point source delivery devices. For example, FIGS. 6 and 7 depict an elongated aperture delivery device 192, such as a fishtail orifice or slot orifice. The major length of the elongated delivery device 192 may be positioned along a major length of the forming gap 120 (perpendicular to the width 148 of the forming gap 120). According to one or more embodiments, an elongated delivery device may be utilized that has a width of from about 0.5 mm to about 3 mm. However, other sizes and subranges of width are contemplated based on desired width and thickness of the formed glass sheet 170.

According to additional embodiments, the point at which the molten glass exits the molten glass delivery device 130 may be below the top edge of the first forming roll 112 and the second forming roll 114. However, the point at which the molten glass exits the molten glass delivery device 130 should be high enough to remain above the level of the puddle 142 so that sufficient puddling can be attained so that a desired glass width 174 can be attained.

According to embodiments described herein, the molten glass 140 may have a viscosity of less than or equal to about 200 poise as it exits the molten glass delivery device 130. According to additional embodiments, the molten glass 140 may have a viscosity of less than or equal to about 150 poise, less than or equal to about 100 poise, less than or equal to about 75 poise, less than or equal to about 50 poise, less than or equal to about 25 poise, less than or equal to about 20 poise, less than or equal to about 15 poise, or even less than or equal to about 10 poise, as it exits the molten glass delivery device 130. The molten glass 140 may have any of these disclosed viscosities as it rests on the upper surface 116 of the first forming roll 112 and the upper surface 118 of the second forming roll 114, and as it passes through the forming gap 120.

In some embodiments, the relatively low viscosities disclosed herein may be utilized because the glass composition which is formed may have a relatively low liquidus viscosity. The temperature where crystal phases start to develop is known as the liquidus temperature. The crystallization point may also be cast in terms of the liquidus viscosity, which is the viscosity of the particular glass composition at the liquidus temperature. In general, the viscosity of the molten glass 140 when delivered out of the molten glass delivery device 130 and in the puddle 142 may be less than the liquidus viscosity of the molten glass 140 such that crystallization is prevented. As described herein, the liquidus viscosity of the molten glass 140 and/or the formed glass sheet 170 may be less than or equal to about 150 poise, less than or equal to about 100 poise, less than or equal to about 75 poise, less than or equal to about 50 poise, less than or equal to about 25 poise, less than or equal to about 20 poise, less than or equal to about 15 poise, or even less than or equal to about 10 poise. Such relatively low liquidus viscosities may be common in some glasses having relatively high refractive indices.

According to the presently disclosed processes, the molten glass 140 may form a puddle 142 (sometimes referred to as a pool herein) over the upper surface 116 of the first forming roll 112 and the upper surface 118 of the second forming roll 114. The formation of the puddle 142 may allow for glass to run past the perimeter of the molten glass delivery device 130 and extend the length of the puddle (i.e., in the direction perpendicular to the width 148 of the forming gap 120. That is, the length of the puddle may be determinative of the width 174 of the formed glass sheet 170. Therefore, increased pooling allows for wider glass sheets 170. Additionally, puddling may allow for the consistent and continued forming of the glass sheet 170 even while an irregular stream of molten glass 140 is delivered from the molten glass delivery device 130. For example, the glass sheet 170 can continue to be formed even when the mass flowrate of molten glass 140 varies.

According to the embodiments described herein, the pair of forming rolls 110 may rotate to continuously form the glass sheet 170 from the molten glass 140. As depicted in FIG. 1, the first forming roll 112 and the second forming roll 114 may rotate in opposite directions with respect to one another to facilitate the forming of the glass sheet 170. The molten glass 140 may pass through the forming gap 120 and exit below the forming gap 120 in a somewhat viscous condition. Following the passing of the molten glass 140 through the forming gap 120, the glass may be cooled to a solid state.

According to one or more embodiments, the pair of forming rolls 110 may rotate at rotational speeds suitable for forming a desired rate of glass sheet 170. For example, the glass forming process disclosed herein may be run at a mass flow rate per unit width in a range of from about 20 lb/hr-inch to about 150 lb/hr-inch. However, other forming speeds are contemplated herein based on glass composition and desired glass sheet dimensions. In some embodiments, the forming rolls 110 may rotate at a rate such as to produce at least about 10 m/min, at least about 11 m/min, at least about 12 m/min, at least about 13 m/min, at least about 14 m/min, at least about 15 m/min, at least about 16 m/min, at least about 17 m/min, at least about 18 m/min, at least about 19 m/min, or even at least about 20 m/min.

The cooling of the molten glass 140 below the forming gap 120 may be enabled by the contacting of the molten glass 140 with the pair of forming rolls 110 at the forming gap 120. The pair of forming rolls 110 may have a temperature that is less than that of the pooled molten glass 140, but still greater than ambient temperatures. For example, the first forming roll 112 and/or the second forming roll 114 may have a temperature of about 450° C. to about 500° C. Heaters, heat exchangers, etc. may be utilized to accurately control the temperature of the pair of forming rolls 110. In some embodiments, the forming rolls 110 may be heated only by contact with the molten glass 140. In additional embodiments, the forming rolls 110 may be maintained at a temperature below that of the molten glass 140 by cooling fluid or other cooling means.

According to one or more embodiments, the forming rolls 110 may be designed to maintain a uniform forming gap 120. For example, the forming rolls 110 may be accurately machined to have a radial uniformity of within 10 microns, within 5 microns, or even better.

In additional embodiments, the forming rolls 110 may be shaped such that thermal expansion to portions of the forming rolls 110 are accounted for. Without being bound by theory, when forming rolls 110 contact the molten glass 140, they are heated up relative to their normal non-contacted temperature, and thermal expansion occurs. This thermal expansion is usually not constant over the whole forming roll 110. For example, the expansion may be larger in the central portion of the forming rolls 110. Therefore, the forming rolls 110 may have a slightly smaller diameter at some regions (such as those in the central portion of the forming rolls 110) at ambient temperature conditions to account for the increased thermal expansion. If no shape compensation is utilized, a glass sheet that is thicker near the edges of the glass sheet 170, thinner in the central portion, may be formed. By having a non-constant roll diameter of at least one of the forming rolls 110, this can be compensated.

According to one or more embodiments, the forming gap 120 has a width 148 of less than or equal to about 800 microns. In additional embodiments, the forming gap 120 has a width 148 of less than or equal to about 700 microns, less than or equal to about 600 microns, less than or equal to about 500 microns, less than or equal to about 400 microns, less than or equal to about 300 microns, less than or equal to about 200 microns, or even less than or equal to about 100 microns. In additional embodiments, the forming gap 120 has a width 148 of greater than or equal to about 100 microns, greater than or equal to about 200 microns, greater than or equal to about 100 microns greater than or equal to about 300 microns, greater than or equal to about 400 microns, greater than or equal to about 500 microns, greater than or equal to about 600 microns, or even greater than or equal to about 700 microns. According to additional embodiments, the forming gap 120 may have a width 148 having a range with an upper bound of any of the upper bounds presently disclosed and a lower bound of any of the lower bounds presently disclosed. As described herein, the width 148 of the forming gap 120 is measured during glass forming to account for any thermal expansion that may occur due to the heating of the rolls.

Upon the passing of the molten glass 140 through the forming gap 120, the glass sheet 170 is formed. The glass sheet 170 has a width 174 measured in a direction perpendicular to the forming gap width 148, an edge 176, and a surface 178. Additionally, the glass sheet 170 has a thickness 172 measured in the same direction as the forming gap width 148.

In one or more embodiments, the glass sheet 170 has a thickness 172 approximately the same as the width of the forming gap 120 immediately upon passing through the forming gap 120. Accordingly, in one or more embodiments, the glass sheet 170 has a thickness 172 immediately upon passing through the forming gap 120 of any of the ranges disclosed herein with respect to the width of the forming gap 120. For example, in one or more embodiments, the glass sheet 170 has a thickness 172 of less than or equal to about 700 microns, less than or equal to about 600 microns, less than or equal to about 500 microns, less than or equal to about 400 microns, less than or equal to about 300 microns, less than or equal to about 200 microns, or even less than or equal to about 100 microns immediately upon passing through the forming gap 120. In additional embodiments, the glass sheet 170 has a thickness 172 of greater than or equal to about 100 microns, greater than or equal to about 200 microns, greater than or equal to about 100 microns greater than or equal to about 300 microns, greater than or equal to about 400 microns, greater than or equal to about 500 microns, greater than or equal to about 600 microns, or even greater than or equal to about 700 microns immediately upon passing through the forming gap 120. According to additional embodiments, the glass sheet 170 has a thickness 172 having a range with an upper bound of any of the upper bounds presently disclosed and a lower bound of any of the lower bounds presently disclosed.

In one or more embodiments, the thickness 172 of the glass sheet 170 varies by about 30 microns or less. For example, the thickness 172 of the formed glass sheet 170 varies by about 20 microns or less, or even by about 10 microns or less. As described herein, the variance of the thickness 172 of the glass sheet 170 refers to the difference in thickness of the glass sheet 170 at two distinct points of thickness measurement.

In one or more embodiments, the glass sheet 170 has a warp of about 50 microns or less. For example, in one or more embodiments, the glass sheet 170 has a warp of about 40 microns or less, about 30 microns or less, about 20 microns or less, or even about 10 microns or less. As used herein and as described by ASTM F1390, "warp" refers to the difference between the maximum and minimum distances of the median surface from the reference plane.

According to some embodiments, the glass sheet 170 has a width 174 about equal to the length of the puddle of molten glass 140 above the forming rolls 110. In additional embodiments, the glass sheet 170 has a width 174 that is less than the length of the puddle of molten glass 140 above the forming rolls 110. For example, in one embodiment, the glass sheet 170 is held in tension as it exits the forming gap 120. Optional additional rollers under the forming rolls 110 may pull the glass sheet 170 and cause it to somewhat stretch. The glass sheet 170 exiting the forming gap 120 may be guided and brought into tension by a post forming roller that drives the glass sheet 170 downwards, usually imposing its speed on the glass sheet 170. This speed may be greater than the speed of the forming rolls 110. However, in one or more embodiments, the speed of the glass sheet 170 is within about 50%, with about 40%, within about 30%, within about 20%, within about 10%, or even within about 5% of the speed of the forming rolls 110. This stretching may slightly decrease the width 174 or the thickness 172 as compared with the dimensions of the forming gap 120. According to one or more embodiments, the thickness 172 and/or the width 174 of the glass sheet 170 following processing is within about within about 30%, within about 20%, within about 10%, or even within about 5% of the corresponding dimensions of the forming gap 120.

Various widths 174 are contemplated herein, such as, for example, from about 50 mm to about 500 mm. For example, in one or more embodiments, the glass sheet 170 has a width 174 of from about 100 mm to about 200 mm. In one or more embodiments, the glass sheet 170 has a width 174 of about 50 mm or greater, about 100 mm or greater, about 150 mm or greater, about 200 mm or greater, about 300 mm or greater, or even about 500 mm or greater, about 400 mm or less, about 300 mm or less, about 200 mm or less, or even about 100 mm or less, or any range or subrange defined by these bounds.

The glass sheet 170 may have an aspect ratio defined as the width 174 of the glass sheet 170 divided by the thickness 172 of the glass sheet. In one or more embodiments, the glass sheet has an aspect ratio of about 100 or greater, about 200 or greater, about 300 or greater, about 400 or greater, about 500 or greater, about 750 or greater, about 1000 or greater, about 1250 or greater, or even about 1500 or greater.

The glass sheet may have a relatively high refractive index. For example, in one or more embodiments, the refractive index of the glass sheet 170 is about 1.7 or greater, about 1.72 or greater, about 1.74 or greater, about 1.76 or greater, about 1.78 or greater, or even about 1.8 or greater.

Following the formation of the glass sheet 170, one or more post-forming steps may be included in the disclosed glass forming processes. However, it should be understood that the post-forming steps may not substantially alter the thickness 172 of the glass sheet 170. In one or more embodiments, the glass sheet 170 is turned from an essentially vertical direction to an essentially horizontal direction. In another embodiment the ribbon is kept essentially vertical until the point of being cooled sufficiently to be separated into discrete sheets. In additional embodiments, the glass sheet 170 is flattened by applying mechanical force while still slightly viscous, the glass sheet 170 is guided until fully-elastic conditions have been reached, and/or the glass sheet 170 is cooled to room temperature (either actively or passively). In one or more embodiments, non-contact supports, such as those disclosed in U.S. Provisional Application Ser. No. 62/524,191, filed Jun. 23, 2017, and U.S. Provisional Application Ser. No. 62/579,543, filed Oct. 31, 2017, are utilized, the teachings of which are incorporated by reference herein in their entirety.

The glass sheet 170 may be cut following cooling to room temperature, or while still at elevated temperatures. In one embodiment, the glass sheet 170 is cut into wafers. For example, in one or more embodiments, the wafers cut from the formed glass sheet 170 are 100 mm diameter wafers, 150 mm diameter wafers, 200 mm diameter wafers, or 300 mm diameter wafers.

Figure 8:
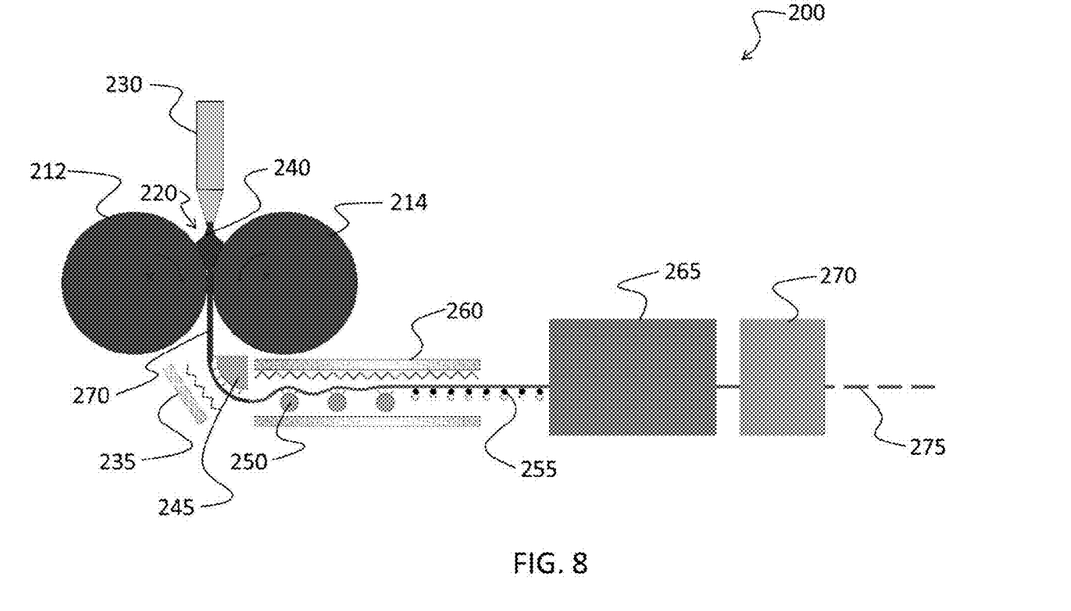
FIG. 8 schematically depicts a glass sheet forming apparatus with heaters.

FIG. 8 shows a further embodiment with active heating of the glass following exit of the glass from the forming rolls. Glass sheet forming apparatus 200 includes molten glass deliver device 230, which delivers molten glass 240 to a forming gap 220 between first forming roll 212 and second forming roll 214 to form glass sheet 270. Glass sheet 270 is heated by heater 235 and directed by air-bearing device 245 to air-bearing supports 250 and rollers 255 for heating by heater 260. Air-bearing device 245 and air-bearing supports 250 support and/or control the direction of glass sheet 270 through application of pressurized air. It is noted that turning of glass sheet 270 is optional. Exposure of glass sheet 270 to heater 235 and heater 260 enable control of the cooling rate of glass sheet 270. Heaters 235 and 260 are operated at a temperature greater than 50° C., or greater than 100° C., or greater than 150° C., or greater than 200° C., or in the range from 50° C. to 500° C., or in the range from 75° C. to 400° C., or in the range from 100° C. to 300° C. Heat provided by heaters 235 and 260 slow the rate of cooling of glass sheet 270 and reduce stress in glass sheet 270. In one embodiment, glass sheet 270 is heated to maintain a viscosity less than $10^{10}$ poise at a distance of at least 0.75 m following exit of glass sheet 270 from forming gap 220. Following controlled cooling, glass sheet 270 is directed to coolers 265 and 270. Separation of glass sheet 270 into parts 275 is performed when the temperature of glass sheet is below the annealing point.

EXAMPLES

Various embodiments will be further clarified by the following examples. Glass was poured from a precious metal crucible at a viscosity of approximately 10 poise on top of a pair of rotating rolls. The rolls had an undercut in their central region designed to leave a 0.3 mm gap when closed against each other. Table 1 reports glass sheet thickness at different rolling speeds. The data show that when the rolling speed is properly adjusted, a desired thickness for a glass sheet can be reached. One can also extrapolate from the data that if a smaller gap were used between the rolls (e.g., 0.2 mm), a glass sheet with a thickness of about 0.2 mm thick sheet could be produced at a sufficient rolling speed. Additionally, it can be seen the data that for a given rolling speed, heated rolls led to a decrease in glass sheet thickness. In the particular example shown, the glass sheet thickness obtained from the heated roll was less than the dimension of the forming gap.

TABLE 1

| Rolling Speed (m/min) | Sheet Thickness (mm) | Roll Condition |
|---|---|---|
| 6.5 | 0.58 | Unheated Roll |
| 8.75 | 0.46 | Unheated Roll |
| 13.25 | 0.38 | Unheated Roll |
| 17.25 | 0.33 | Unheated Roll |
| 13.25 | 0.26 | Heated Roll at 475° C. |

As used herein, the singular forms "a," "an" and "the" include plural referents unless the context clearly dictates otherwise. Thus, for example, reference to a "component" includes aspects having two or more such components, unless the context clearly indicates otherwise.

Directional terms as used herein—for example up, down, right, left, front, back, top, bottom—are made only with reference to the figures as drawn and are not intended to imply absolute orientation.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

Ranges can be expressed herein as from "about" one particular value, and/or to "about" another particular value. As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the endpoints of each of the ranges are significant both in relation to the other endpoint, and independently of the other endpoint.

What is claimed is:

1. A method for forming a glass sheet, the method comprising:
   supplying a feed of molten glass from a molten glass delivery device to an upper surface of a pair of forming rolls, the molten glass forming a puddle over upper surfaces of the pair of forming rolls, the pair of forming rolls spaced apart by a forming gap, the forming gap having a width of less than or equal to about 800 microns, wherein the molten glass of the puddle has a viscosity of less than about 25 poise;
   rotating the pair of forming rolls at a rate to continuously form at least about 10 meters per minute of a glass sheet from the molten glass, the glass sheet having a thickness of less than or equal to about 800 microns immediately upon passing though the forming gap such that the thickness of the glass sheet varies by about 30 microns or less; and
   directing the glass sheet to a heater using pressurized air from an air-bearing device controlling a direction of the glass sheet toward one or more air-bearing supports for heating the glass sheet by the heater, the heater configured to operate at a temperature greater than 100° C. and less than 500° C. such that the glass sheet has a viscosity less than $10^{10}$ poise at a distance of at least 0.75 m from the forming gap,
   wherein:
      the glass sheet comprises a glass composition with a refractive index of about 1.7 or greater,
      the molten glass comprises a liquidus viscosity of about 50 poise or less, and
      when supplied from the molten glass delivery device, the viscosity of the molten glass of the puddle is less than the liquidus viscosity of the molten glass of the puddle.

2. The method of claim 1, wherein the glass sheet has a width measured in a direction perpendicular to the forming gap width, and wherein a ratio of the width of the glass sheet to the thickness of the glass sheet is about 100 or greater.

3. The method of claim 1, wherein the forming rolls are positioned horizontally relative to one another.

4. The method of claim 1, wherein no portion of the forming rolls contact one another.

5. The method of claim 1, wherein the molten glass is supplied from a single point source.

6. The method of claim 5, wherein the single point source is a pipe.

7. The method of claim 1, wherein the molten glass is supplied from a plurality of point sources.

8. The method of claim 7, wherein the plurality of point sources are positioned along a major length of the forming gap.

9. The method of claim 1, further comprising cutting the glass sheet.

10. The method of claim 9, wherein the glass sheet is cut into a 100 mm diameter wafer.

11. The method of claim 1, wherein at least one of the pair of forming rolls comprises a non-constant roll diameter.

12. The method of claim 1, wherein the forming gap has a width less than about 100 microns.

13. The method of claim 1, wherein the thickness of the glass sheet varies by about 10 microns or less.

14. A method for forming a high refractive index glass sheet, the method comprising:
   supplying a feed of molten glass from a molten glass delivery device to an upper surface of a pair of forming rolls, the molten glass forming a puddle over upper surfaces of the pair of forming rolls, the pair of forming rolls spaced apart by a forming gap, the forming gap having a width of less than or equal to about 800 microns, wherein the molten glass of the puddle has a viscosity of less than about 25 poise;
   rotating the pair of forming rolls at a rate to continuously form at least about 10 meters per minute of a glass sheet from the molten glass, the glass sheet having a thickness of less than or equal to about 800 microns immediately upon passing though the forming gap such that the thickness of the glass sheet varies by about 30 microns or less; and directing the glass sheet to a heater using pressurized air from an air-bearing device controlling a direction of the glass sheet toward one or more air-bearing supports for heating the glass sheet by the heater, the heater configured to operate at a temperature greater than 100° C. and less than 500° C. such that the glass sheet has a viscosity less than $10^{10}$ poise at a distance of at least 0.75 m from the forming gap, wherein:

a glass composition of the glass sheet has a refractive index of about 1.7 or greater and the molten glass has a liquidus viscosity of about 50 poise or less, the glass sheet has an aspect ratio defined as a width of the glass sheet divided by the thickness, wherein the aspect ratio is greater than or equal to 200, and when supplied from the molten glass delivery device, the viscosity of the molten glass of the puddle is less than the liquidus viscosity of the molten glass of the puddle.

15. A method for forming a glass sheet, the method comprising:

supplying a feed of molten glass from a molten glass delivery device to an upper surface of a pair of forming rolls, the molten glass forming a puddle over upper surfaces of the pair of forming rolls, the pair of forming rolls spaced apart by a forming gap, wherein the molten glass of the puddle has a viscosity of less than about 25 poise;

rotating the pair of forming rolls at a rate to continuously form at least about 10 meters per minute of a glass sheet from the molten glass, the glass sheet having a thickness of less than or equal to about 1000 microns immediately upon passing though the forming gap such that the thickness of the glass sheet varies by about 30 microns or less; and directing the glass sheet to a heater using pressurized air from an air-bearing device controlling a direction of the glass sheet toward one or more air-bearing supports for heating the glass sheet by the heater, the heater configured to operate at a temperature greater than 100° C. and less than 500° C. such that the glass sheet has a viscosity less than $10^{10}$ poise at a distance of at least 0.75 m from the forming gap, wherein:

the glass sheet comprises a glass composition with a refractive index of about 1.7 or greater, the molten glass comprises a liquidus viscosity of about 50 poise or less, and when supplied from the molten glass delivery device, the viscosity of the molten glass of the puddle is less than the liquidus viscosity of the molten glass of the puddle.

* * * * *